United States Patent [19]

Goto

[11] 4,254,234

[45] Mar. 3, 1981

[54] ULTRAVIOLET LIGHT CURABLE COATING COMPOSITIONS

[75] Inventor: Kiyoshi Goto, Kyobashi, Japan

[73] Assignee: Toyo Ink Manufacturing Co., Ltd., Tokyo, Japan

[21] Appl. No.: 960,804

[22] Filed: Nov. 15, 1978

[30] Foreign Application Priority Data

Nov. 21, 1977 [JP] Japan ................................ 52/138951

[51] Int. Cl.³ .................... C08J 3/28; C08F 261/02
[52] U.S. Cl. ............................ 525/153; 204/159.14; 204/159.15; 204/159.16
[58] Field of Search ................. 525/55, 13, 153; 528/386; 204/159.22, 159.19, 159.14

[56] References Cited

U.S. PATENT DOCUMENTS

| | | | |
|---|---|---|---|
| 3,702,765 | 11/1972 | Laakso | 96/33 |
| 3,840,390 | 10/1974 | Kozu et al. | 204/159.16 X |
| 3,969,323 | 7/1976 | Forrer et al. | 260/73 |
| 3,984,381 | 10/1976 | Tsuchiya et al. | 260/33.6 UA X |
| 4,008,138 | 2/1977 | Rosen et al. | 204/159.14 |
| 4,028,204 | 6/1977 | Rosen et al. | 204/159.14 |

Primary Examiner—Lewis T. Jacobs
Assistant Examiner—Arthur H. Koeckert
Attorney, Agent, or Firm—Jordan and Hamburg

[57] ABSTRACT

A process for the preparation of an esterified resin for ultraviolet light curable coating compositions which comprises reacting an ethylenically unsaturated five-membered cyclic compound, such as cyclopentadiene, with a compound having both at least a double bond and hydroxyl group in the molecule, such as allyl alcohol, to obtain a hydroxyl group-containing resin which is then esterified with a carboxyl group-containing benzophenone derivative and, if desired, further esterified with an unsaturated carboxylic acid thereby to obtain the esterified resin. This invention also relates to the esterified resin so obtained and ultraviolet light curable coating compositions containing the same.

23 Claims, No Drawings

ULTRAVIOLET LIGHT CURABLE COATING COMPOSITIONS

This invention relates to curable coating compositions containing a novel resinous built-in sensitizer and more particularly to such curable coating compositions for inks.

With the recent progress of printing techniques, a high printing speed has been required in the practice of printing. Because of this, it is desirable that printing inks be dried or cured more rapidly or at a higher drying or curing rate. As a means for accelerating the drying rate in conventional high-speed printing, a method for drying printed matter by means of direct fire or hot gas heating has been employed. Printing inks used in such heat-set printing contain 30-40% of a solvent which is to be evaporated after printing. Thus a problem of environmental pollution will often be raised in factories wherein such heat-set printing is carried out since part of the solvent vapor evaporated from the printing inks used is discharged in the factories. Therefore, there have been sought printing inks containing no volatile matter and capable of being dried by the use of any means other than evaporation.

Such being the case, there have already been proposed several inks, such as ultraviolet light or heat curable, solvent-free inks, which may be dried without being accompanied with the evaporation of solvents.

Japanese Patent Application No. 18325/73 (Japanese Patent Application Laying-Open No. 124133/74) filed by Toyo Ink Manufacturing CO. Ltd., the assignee from the applicants of the present U.S. application, discloses that a resin prepared by the esterification of a dicyclopentadiene/allyl alcohol copolymer with acrylic or methacrylic acid will exhibit excellent compatibility and cross-linkability when a curable ink containing said resin is prepared. Ultraviolet light curable coating compositions in which said resin is used comprise, as the main components, an addition polymerizable prepolymer, monomer and photosensitizer. The photosensitizers generally used are the derivatives of benzophenone and benzoine, however, they are required to be incorporated in an excessive amount in a coating composition to increase the photocurability thereof since they have low photoinitiation efficiency. Thus, when ultraviolet light curable coating compositions, particularly printing inks, containing an excessive amount of such photosensitizers are used, not only the rollers and blankets of printers used will be swollen but also problems as to odor, volatility, migration and the like will be raised.

To eliminate such disadvantages, Japanese Patent Application Laying-Open Gazette No. 61460/73 discloses an autophotopolymerizable alkyd or urethan-modified resin in which built-in o-benzoylbenzoic acid is present, however, these resins are unsatisfactory in emulsification and fluidity because of their poor dispersibility of pigments therein and their poor wettability with the pigments whereby the use of printing inks containing such resins will not result in the production of satisfactory printed matter.

As a result of their intensive studies, the present inventor has found novel, further improved autophotopolymerizable resins which eliminate said various disadvantages.

The primary object of this invention is to provide ultraviolet light curable coating compositions containing said novel resins.

This object is accomplished by the provision of an ultraviolet light curable coating composition characterized by containing an esterified resin prepared by reacting together the following compounds (A) and (B), the compound (A) being a five-membered cyclic compound having unsaturated double bonds or a Diels-Alder's reaction product thereof

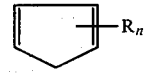

wherein R is an organic residue having 1-3 carbon atoms and n is zero or an integer of 1-6 and the compound (B) being one having both at least a double bond and at least a hydroxyl group in the molecule, to obtain a hydroxyl group-containing resin (hereinafter referred to as "resin (I)" for brevity which, if desired, is then hydrogenated to obtain a hydrogenated, hydroxyl group-containing resin, and esterifying any one of the thus-obtained resins with a carboxyl group-containing benzophenone derivative or with a carboxyl group-containing benzophenone and an unsaturated carboxylic acid to obtain the esterified resin.

The ethylenically unsaturated five-membered cyclic compound (A) used herein is cyclopentadiene, dicyclopentadiene, tricyclopentadiene, tetracyclopentadiene or a lower alkyl-substituted derivative thereof wherein the lower alkyl is one having 1-3 carbon atoms. The compound (B) used herein is a compound having both at least a polymerizable double bond and at least a hydroxyl group in the molecule, such as (meth)acryl alcohol, 2-hydroxyethyl (meth)acrylate, 2-hydroxypropyl (meth)acrylate or butenediol.

The hydroxyl group-containing resin is obtained by reacting the compound (A) with the compound (B) at 150°-350° C. in the presence or absence of a radical polymerization catalyst and, if desired, in the presence of a solvent such as xylene.

The compounds (A) and (B) may be reacted together in any molar ratio between 30/70 and 95/5, preferably between 40/60 and 80/20.

In this invention, the hydrogenated, hydroxyl group-containing resin obtained by hydrogenating the resin (I) may also be used. At this time, conditions for the hydrogenation should be selected so that only the carbon-carbon double bonds are hydrogenated without decreasing the hydroxyl groups of the resin (I) by hydrogenation. Thus, it is desirable that the hydrogenation be carried out in the presence of a noble metal catalyst such as a platinum or palladium catalyst. It is also desirable that the hydrogenation in the presence of the noble metal catalyst be carried out at room temperature to 250° C. at atmospheric pressure to 100 Kg/cm$^2$ without a decrease in hydroxyl groups of the resin (I).

It is desirable in the hydrogenation that at least 40%, preferably at least 60%, of the intercarbon double bonds of the resin (I) be hydrogenated whereby is obtained a resin (I) in hydrogenated form which has remarkably decreased odor and will enable tinted, clear or light colored printing inks or coating materials to have remarkably improved tinting strength and improved coloring properties by adding the hydrogenated resin thereto.

The resin (I) or that in hydrogenated form is esterified with a carboxyl group-containing benzophenone derivative and, if desired, further esterified with an unsaturated carboxylic acid to obtain an esterified resin.

The carboxyl group-containing benzophenone derivatives used in the esterification include o-benzoylbenzoic acid, p-benzoylbenzoic acid, carbonyldibenzoic acid, carboxybenzoylphthalic anhydride, benzophenonetetracarboxylic acid, benzophenonetetracarboxylic dianhydride and dialkylamino-substituted benzoylbenzoic acid wherein the alkyl is methyl or ethyl.

The unsaturated carboxylic acids used herein include acrylic acid, methacrylic acid and itaconic acid.

In the above esterification, the hydroxyl groups of the resin (I) or its hydrogenated form are reacted with the carboxyl group-containing benzophenone derivative and, if desired, further reacted with the unsaturated carboxylic acid. The esterification is effected under usual esterifying conditions in the presence or absence of a suitable catalyst to obtain a resin (III). According to this invention, a coating composition may be incorporated with the esterified resin to obtain an ultraviolet light curable coating composition having an improved autophotopolymerizable function.

The ultraviolet light curable coating composition (hereinafter sometimes referred to as "composition of this invention") of this invention is characterized by containing the esterified resin. When the composition of this invention is radiated by ultraviolet light, the esterified resin itself contained therein will generate radicals and be dried while functioning as a photosensitizer to photocure reactive solvents such as monomers and prepolymers having radically crosslinkable ethylenic double bonds, the reactive solvents being the components other than the esterified resin in the coating composition of this invention.

Photocurable resins have heretofore been incorporated with an excessive amount of a sensitizer whereby the resulting mixture is disadvantageous in odor, volatility, migration, dispersibility and the like; particularly, inks containing such a photocurable resin and such an amount of a sensitizer are disadvantageous in that the sensitizer decreases the viscoelasticity of the ink, degrades particularly when emulsified, hinders the ink from forming clear dots on a substrate when printed and causes greasing, scumming and other typographical troubles. Further, the sensitizer has the disadvantage that a part thereof is attacked by solvents or the like in the ink since the sensitizer is not present in the form of a built-in material in the ink cured. These various disadvantages may be overcome by the use of the esterified resin.

The esterified resin is much improved in dispersibility for pigments since it is made from a five-membered cyclic compound having conjugated double bonds as the starting material.

For conventional ultaviolet light curable inks, only special solvents such as glycols, ethers thereof and Solvesso (trademark, Shell Chemical Co.) may be used as cleaning solvents; on the other hand, ultraviolet light curable inks containing the esterified resin as the vehicle may easily be cleaned with the same petroleum cleaning solvent as used as the cleaning solvent for general oily inks.

The compositions of this invention comprise the esterified resin as the main component, reactive solvents and, if desired, sensitizers. They may further comprise pigments, solvents other than the reactive solvents, fillers and additives.

The reactive solvent which may be used in this invention is at least one member selected from the group consisting of crosslinkable monomers and prepolymers having crosslinkable reactive double bonds, the monomers and prepolymers being crosslinkable under the action of heat or radiation such as ultraviolet light or electronic beam. The reactive solvent is preferably used in an amount of 5-60 parts by weight per 30-80 parts by weight of the esterified resin.

The crosslinkable monomers used herein are preferably acrylic acid derivatives or vinylic compounds such as styrene with acrylic acid derivatives being particularly preferred. Such acrylic acid derivatives include pentaerithritol tetra(meth)acrylate, pentaerithritol tri(meth)acrylate, dipentaerithritol hexaacrylate, dipentaerithritol pentaacrylate, trimethylolpropane tri(meth)acrylate, ethylene glycol di(meth)acrylate, diethylene glycol di(meth)acrylate, 1,3-butanediol di(meth)acrylate, 1,4-butanediol di(meth)acrylate, 1,6-hexanediol di(meth)acrylate, 2-hydroxyethyl (meth)acrylate, 2-hydroxypropyl (meth)acrylate alkyl(meth)acrylate (wherein the alkyl is $C_1$-$C_{18}$ alkyl), glycidyl (meth)acrylate and other crosslinkable monomers having an acrylic or methacrylic residue.

The crosslinkable prepolymers used herein include an adduct of a bisphenol A type epoxy resin with (meth)acrylic acid, an urethane-modified acrylate and an alkyd acrylate. It is desirable that the crosslinkable prepolymer is used in an amount of not higher than 10 parts by weight per 30-80 parts by weight of the esterified resin.

The use of these reactive solvents in the preparation of the composition of this invention will make it possible to disperse the pigment and the like uniformly in the composition and cure the composition rapidly and easily.

The expression "(meth)acrylate" is intended to mean "acrylate or methacrylate".

The composition of this invention is capable of being cured at a satisfactorily rapid curing speed even in the absence of usual sensitizers, and the curing speed may be further enhanced by addition of a photosensitizer to the composition.

The suitable photosensitizers used herein include acyloins such as benzoin methyl ether, benzoine ethyl ether, decyl chloride, decyl bromide and decylamine; ketones such as benzophenone, p-chlorobenzophenone, benzil, ethyl methyl ketone, cyclopentanone, capronbenzoylcyclobutanone, dioctylacetone, N,N'-diethylaminobenzophenone and tetraethyl-p,p'-diaminobenzophenone; and polycyclic quinones such as benzoquinone and anthraquinone. These photosensitizers may be used singly or jointly.

The composition of this invention may contain the photosensitizer as mentioned above. When the photosensitizer is used, the amount thereof used is 0-30 parts by weight per 30-80 parts by weight of the esterified resin and is not more than 500 parts, preferably not more than 150 parts by weight per 100 parts by weight of the benzophenone derivative.

The composition of this invention may contain 0-60 parts by weight of pigments and may further contain other organic solvents, fillers, additives and the like.

Unlike conventional coating compositions containing usual organic solvents in large proportions, the compositions of this invention will not raise problems as to environmental pollution due to discharge of the organic solvents vaporized since they are soon curable by radiation with ultraviolet light. Thus, the composition of this invention is suitable for use as a vehicle for paints, lacquers and printing inks. In cases where the esterified resin according to this invention is used as the vehicle for printing inks, it has a further advantage that it enables the printing inks to have excellent printability since it is satisfactorily soluble in the reactive solvents and permits the pigment to be dispersed satisfactorily therein. In addition, the printing ink applied to a substrate exhibits excellent moldability and adhesion to the substrate as well as excellent gloss and resistance to rubbing friction.

This invention will be better understood by the following Examples wherein all the parts are by weight unless otherwise specified.

EXAMPLE 1

One hundred and thirty-two (132) parts of dicyclopentadiene of 97% purity, 58 parts of allyl alcohol and 110 parts of commercially available mixed xylene were introduced into an autoclave provided with a stirrer, and the resulting mixture was reacted at 260° C. for 5 hours. After the end of the reaction, the autoclave was cooled and the contents (the reaction mixture) were withdrawn therefrom. The reaction mixture was then distilled to remove the unreacted monomer, low polymers and xylene, thereby obtaining 152 parts of a resin (I)-1. Fifty-four (54) parts of the resin (I)-1, 46 parts of o-benzoylbenzoic acid, 10 parts of toluene and 1 part of p-toluenesulfonic acid were introduced into a four-necked flask provided with a condenser tube and a stirrer to form a mixture which was reacted at 130°–140° C. for 10 hours under reflux of the toluene while blowing an inert gas (nitrogen gas) into the flask and, when the acid value of the resulting reaction mixture reached 80, freed of the toluene at 140°–150° C. for 2 hours thereby to obtain an esterified resin (III)-1 having an acid value of 7, a softening point of 70° C. and a viscosity of Zn (Gardner viscosity: a dilution of the resin/triallyl isocyanurate in a wt. ratio of 1:2 was tested by a Gardner bubble viscosimeter).

Seventy (70) parts of the esterified resin (III)-1 were dissolved in 30 parts of trimethylolpropane triacrylate to obtain a vehicle (1). Using the vehicle (1), an offset red ink A was prepared in accordance with the following formulation.

Composition of the offset red ink

| Vehicle (1) | 60 Parts |
| Carmin 6B (T) (monoazo pigment produced by Toyp Ink Manufacturing Co., Ltd.) | 18 Parts |
| Trimethylolpropane triacrylate | 22 Parts |

The offset red ink so obtained was printed on art paper by the use of a Hidel KORD monochromatic printer and soon thereafter mounted on a conveyor to be dried by the radiation of a 2 KW high pressure mercury lamp H-2000L (produced by Tokyo Shibaura Electric Co., Ltd.) which was 13 cm apart from the ink so printed on the art paper.

EXAMPLE 2

Using the vehicle (1) obtained in Example 1, an offset red ink B was prepared in the following formulation.

Formulation of the offset red ink B

| Vehicle (1) | 59 Parts |
| Carmine 6B (T) (monoazo pigment produced by Toyo Ink Manufacturing Co., Ltd.) | 18 Parts |
| Trimethylolpropane triacrylate | 22 Parts |
| 4,4'-bisdiethylaminobenzophenone | 1 Part |

The offset red ink B so prepared was printed and radiated by ultraviolet light in the same manner as in Example 1.

EXAMPLE 3

One hundred and thirty-two (132) parts of dicyclopentadiene of 97% purity, 110 parts of 2-hydroxyethyl acrylate and 110 parts of commercially available mixed xylene were charged into an autoclave to form a mixture which was reacted at 260° C. for 5 hours and then distilled to obtain 215 parts of a resin (I)-2. The resin (I)-2 had a softening point of 95° C. and OH groups in the amount of 0.30 gr equivalent/100 g of resin. Sixty-five (65) parts of the resin (I)-2, 35 parts of p-benzoylbenzoic acid, 1 part of p-toluenesulfonic acid and 10 parts of toluene were reacted together for esterification, thereby to obtain an esterified resin (III)-2 having an acid value of 15, a viscosity of $Z_3$ (Gardner viscosimeter) and a softening point of 75° C. Sixty-eight (68) parts of the esterified resin (III)-2 were thermally dissolved in 32 parts of trimethylolpropane to obtain a vehicle (2).

Using the vehicle (2), an offset red ink C was prepared in the same manner as in Example 1.

Composition of the offset red ink C

| Vehicle (2) | 58 Parts |
| Carmine 6B (T) (monoazo pigment produced by Toyo Ink Manufacturing Co., Ltd.) | 18 Parts |
| Trimethylolpropane triacrylate | 24 Parts |

The offset red ink C so obtained was printed and radiated by ultraviolet light in the same manner as in Example 1.

EXAMPLE 4

Sixty-two (62) parts of the resin (I)-1 obtained in Example 1, 33 parts of p-benzoylbenzoic acid and 10 parts of toluene were charged into a four-necked flask provided with a condenser tube and a stirrer to form a mixture which was then reacted at 130°–140° C. for 10 hours under reflux of the toluene while blowing an inert gas (N₂) into the flask and, when the acid value of the resulting reaction mixture reached 5.0, freed of the toluene at 140°–150° C. for 3 hours thereby to obtain an esterified resin (III)-4. Then, 92 parts of the esterified resin (III)-4, 5 parts of acrylic acid, 1.0 part of p-toluenesulfonic acid and 0.1 part of hydroquinone were introduced into a four-necked flask fitted with a condenser and a stirrer were reacted together at 100° C. for 10 hours under a reflux of cyclohexane/methyl isobutyl ketone in the voluminal ratio of 1:1 and then heated to 120° C. to distil off the cyclohexane and methyl isobutyl ketone thereby obtaining an esterified resin (III)-4' having an acid value of 12 and a viscosity of $Z_2$. Sixty (60) parts of the esterified resin (III)-4' were thermally dissolved in 40 parts of tetramethylolmethane triacrylate to obtain a vehicle (3). Using the vehicle (3) so obtained, an offset red ink D was prepared in the same manner as in Example 1.

Composition of the offset red ink D

| Vehicle (3) | 58 Parts |
|---|---|
| Carmine 6B (T) (monoazo pigment produced by Toyo Ink Manufacturing Co., Ltd.) | 18 Parts |
| Tetramethylolmethane triacrylate | 24 Parts |

The offset red ink D so obtained was printed and radiated by ultraviolet light in the same manner as in Example 1.

EXAMPLE 5

One hundred (100) parts of the resin (I)-1 obtained in Example 1 were dissolved in 75 parts of commercially available mixed xylene and incorporated with 1 part of palladium carbon containing palladium in a concentration of 5 parts (5% P-C standard product supplied by Nippon Engelhart Co.) to form a mixture which was then hydrogenated at 150° C. and a hydrogen pressure of 30 Kg/cm$^2$ for about one hour and distilled to remove the solvent therefrom thereby obtaining a resin (I)-1 in hydrogenated form (hereinafter referred to as "resin (II)-5").

Then, 76 parts of the resin (II)-5, 10 parts of commercially available toluene, 1 part of p-toluenesulfonic acid and 24 parts of 3,3',4,4'-benzophenonetetracarboxylic dianhydride were reacted together at 130°-140° C. for 10 hours under reflux of the toluene in a four-necked flask provided with a condenser tube and a stirrer while blowing an inert gas (N$_2$) into the flask and, when the acid value of the resulting reaction mixture reached 8.0, heated to 140°-150° C. for 2 hours to remove the toluene therefrom thereby obtaining an esterified resin (III)-5 having an acid value of 6, a softening point of 83° C. and a viscosity of Z$_4$.

Sixty-five (65) parts of the esterified resin (III)-5 were thermally dissolved in 35 parts of ethylene glycol diacrylate to obtain a vehicle (4). Using the vehicle (4), an offset red ink E was prepared in accordance with the following formulation.

Composition of the offset red ink E

| Vehicle (4) | 57 Parts |
|---|---|
| Carmine 6B (T) (monoazo compound produced by Toyo Ink Manufacturing Co., Ltd.) | 18 Parts |
| Ethylene glycol diacrylate | 25 Parts |

The offset red ink E so obtained was printed and radiated by ultraviolet light.

EXAMPLE 6

Sixty-two (62) parts of the hydrogenated resin (II)-5, 33 parts of p-benzoylbenzoic acid and 10 parts of toluene were introduced into a four-necked flask provided with a reflux tube and a stirrer to form a mixture which was reacted together at 130°-140° C. for 8 hours under reflux of the toluene while blowing an inert gas (N$_2$) into the flask and, when the acid value of the resulting reaction mixture reached 6.0, heated to 140°-150° C. for 3 hours to remove the toluene therefrom thereby obtaining an esterified resin (III)-6.

Ninety-two (92) parts of the esterified resin (III)-6 so obtained, 7 parts of acrylic acid, 1.0 part of p-toluenesulfonic acid and 0.1 part of hydroquinone were introduced into a four-necked flask provided with a condenser and a stirrer to form a mixture which was then reacted together at 100° C. for 7 hours under reflux of 20 parts of cyclohexane/methyl isobutyl ketone in a voluminal ratio of 1:1 and thereafter heated to 120° C. to remove the cyclohexane and methyl isobutyl ketone therefrom thereby obtaining an esterified resin (III)-6' having an acid value of 12 and a viscosity of Z$_1$.

Seventy-three (73) parts of the esterified resin (III)-6' were thermally dissolved in 27 parts of tetramethylolpropane triacrylate to obtain a vehicle (5) so obtained, an offset red ink F was prepared in the same manner as in Example 1.

Composition of the offset red ink F

| Vehicle (5) | 61 Parts |
|---|---|
| Carmine 6B (T) (monoazo pigment produced by Toyo Ink Manufacturing Co., Ltd. | 18 Parts |
| Tetramethylolpropane triacryate | 21 Parts |

The offset red ink F so obtained was printed and radiated by ultraviolet light in the same manner as in Example 1.

EXAMPLE 7

The esterified resin (III)-4' obtained in Example 4 and the esterified resin (III)-6' were tested for their color by the use of a Gardner color tube with the result that the color of a mixture of one part of the esterified resin (III)-4' and 2 parts of triisocyanurate corresponded to a Gardner color tube 9 while the color of a mixture of one part of the esterified resin (III)-6' and 2 parts of triisocyanurate corresponded to a Gardner color tube 2.

COMPARATIVE EXAMPLE 1

Eighty (80) parts of the resin (I)-1 obtained in Example 1, 20 parts of acrylic acid, 1 part of p-toluenesulfonic acid and 0.1 part of hydroquinone were charged into a four-necked flask fitted with a condenser and a stirrer to form a mixture which was reacted at 100° C. for 10 hours under reflux of cyclohexane/methyl isobutyl ketone in a voluminal ratio of 1:1 and then heated to 120° C. to distil off the cyclohexane and methyl isobutyl ketone thereby obtaining an esterified resin (III)'-1 having an acid value of 14 and a viscosity of Z$_1$. Then, 70 parts of the esterified resin (III)'-1 so obtained were dissolved in 30 parts of trimethylolpropane triacrylate to obtain a vehicle (6). Using the vehicle (6), an offset red ink G was prepared in accordance with the following formulation.

Composition of the offset red ink G

| Benzophenone | 10 Parts |
|---|---|
| Vehicle (6) | 57 Parts |
| Carmine 6B (T) (monoazo pigment produced by Toyo Ink Manufacturing Co., Ltd.) | 18 Parts |
| Trimethylolpropane triacrylate | 15 Parts |

The offset red ink G so obtained was printed and radiated by ultraviolet light in the same manner as in Example 1.

COMPARATIVE EXAMPLE 2

There were reacted together at 80°-90° C. 76.1 parts of pentaerithritol diacrylate and 13.7 parts of benzophenonetetracarboxylic dianhydride in the presence of 1.0 part of p-toluenesulfonic acid thereby to obtain an esterified resin (III)'-2 thereof.

Then, 60 parts of the esterified resin (III)'-2 were dissolved in 40 parts of trimethylolpropane triacrylate to obtain a vehicle (7). Using the vehicle (7), an offset red ink H was prepared in accordance with the following formulation.

Formulation of the offset red ink H

| | |
|---|---|
| Vehicle (7) | 62 Parts |
| Carmine 6B (T) (monoazo compound produced by Toyo Ink Manufacturing Co., Ltd.) | 18 Parts |
| Trimethylolpropane triacrylate | 20 Parts |

The offset red ink H was printed and radiated by ultraviolet light in the same manner as in Example 1.

The inks obtained in the aforesaid Examples and Comparative examples were evaluated with the results being indicated in the following Table.

TABLE

| Ink No. | Note 1 Sensitivity of ink | Note 2 Odor of printed matter | Gloss of printed matter | Note 3 Swell of blanket | Compatibility with trimethylolpropane triacrylate | Printability |
|---|---|---|---|---|---|---|
| Offset red ink A (Example 1) | 25 m/m | None | Very good | None | Capable of being diluted to any extent. | 20,000 sheets satisfactorily printed without troubles. |
| Offset red ink B (Example 2) | 35 m/m | None | Very good | A little | Capable of being diluted to any extent. | 20,000 sheets satisfactorily printed without troubles. |
| Offset red ink C (Example 3) | 30 m/m | None | Somewhat bad | None | Capable of being diluted to any extent. | 20,000 sheets satisfactorily printed without troubles. |
| Offset red ink D (Example 4) | 25 m/m | None | Good | None | Capable of being diluted to any extent. | 20,000 sheets satisfactorily printed without troubles. |
| Offset red ink E (Example 5) | 30 m/m | None | Good | None | Capable of being diluted to any extent. | 20,000 sheets satisfactorily printed without troubles. |
| Offset red ink F (Example 6) | 33 m/m | None | Very good | None | Capable of being diluted to any extent. | 20,000 sheets satisfactorily printed without troubles. |
| Offset red ink G (Comparative example 1) | 25 m/m | Offensive odor | Bad | Some | Turbid white when a 50% dilution reached. | Up to 500 sheets printed without blurs. |
| Offset red ink H (Comparative example 2) | 15 m/m | None | Bad | None | Capable of being diluted to any extent. | Up to 2,000 sheets printed without blurs. |

Note 1:
Ink sensitivity to ultraviolet light radiation was tested by finger touch method and expressed in terms of conveyor speed required to dry printed matter.
Note 2:
Printed matter dried by ultraviolet light radiation was tested to see whether it had odor.
Note 3:
Ink was dropped on nitrile rubber type blanket for use for general oily inks, allowed to stand thereon for 24 hours and tested to see whether it caused swelling of the blanket.

What is claimed is:

1. A process for the preparation of an esterified resin for ultraviolet light curable coating compositions, which comprises:
reacting an ethylenically unsaturated five-membered cyclic compound (A) represented by the following formula

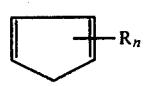

wherein R is an organic residue having 1-3 carbon atoms, and n is zero or an integer of 1-6, and the Diels-Alder's reaction products, with a compound (B) having both at least one polymerizable double bond and at least one hydroxyl group in the molecule, to obtain a hydroxyl group-containing resin, said compound (A) and (B) being reacted together in a molar ratio of from 30/70 to 95/5, and then
esterifying the thus-obtained resin with a carboxyl group-containing benzophenone derivative to obtain the esterified resin.

2. A process according to claim 1, further comprising hydrogenating the hydroxyl group-containing resin prior to the esterification.

3. A process according to claim 1, further comprising additionally esterifying the esterified resin with an unsaturated carboxylic acid.

4. A process according to claim 2, further comprising additionally esterifying the esterified resin with an unsaturated carboxylic acid.

5. A process according to any one of the preceding claims, wherein the ethylenically unsaturated five-membered cyclic compound (A) is cyclopentadiene, dicyclopentadiene, tricyclopentadiene, tetracyclopentadiene or a lower alkyl-substituted compound thereof wherein the alkyl has 1-3 carbon atoms.

6. A process according to any one of claims 1-4, wherein the compound (B) is allyl alcohol, methallyl alcohol, 2-hydroxyethyl acrylate, 2-hydroxyethyl methacrylate, 2-hydroxypropyl acrylate, 2-hydroxypropyl methacrylate or butenediol.

7. A process according to any one of claims 1-4, wherein the ethylenically unsaturated five-membered cyclic compound (A) is cyclopentadiene, dicyclopentadiene, tricyclopentadiene, tetracyclopentadiene or a lower alkyl-substituted compound thereof wherein the alkyl has 1-3 carbon atoms, and the compound (B) is allyl alcohol, methallyl alcohol, 2-hydroxyethyl acrylate, 2-hydroxyethyl methacrylate, 2-hydroxypropyl acrylate, 2-hydroxypropyl methacrylate or butenediol.

8. A process according to claim 1, 2, 3 or 4, wherein the carboxyl group-containing benzophenone derivative is o-benzoylbenzoic acid, p-benzoylbenzoic acid, carbonyldibenzoic acid, carboxybenzoylphthalic anhydride, benzophenonetetracarboxylic acid, benzophenonetetracarboxylic dianhydride or a dialkylamino-substituted benzoylbenzoic acid wherein the alkyl is methyl or ethyl.

9. A process according to claim 7, wherein the carboxyl group-containing benzophenone derivative is o-benzoylbenzoic acid, p-benzoylbenzoic acid, carbonyldibenzoic acid, carboxybenzoylphthalic anhydride, benzophenonetetracarboxylic acid, benzophenonetetracarboxylic dianhydride or a dialkylamino-substituted benzoylbenzoic acid wherein the alkyl is methyl or ethyl.

10. A process according to claim 3 or 4 wherein the unsaturated carboxylic acid is acrylic acid, methacrylic acid or itaconic acid.

11. An esterified resin obtained by the process of claim 1, 2, 3 or 4.

12. An esterified resin obtained by the process of claim 7.

13. An ultraviolet light curable coating composition comprising an esterified resin of claim 12 and a reactive solvent.

14. An ultraviolet light curable coating composition comprising an esterified resin of claim 12 and a reactive solvent.

15. An ultraviolet light curable coating composition comprising 30-80 parts by weight of an esterified resin of claim 11, 5-50 parts by weight of a reactive solvent and 0-60 parts by weight of a pigment.

16. An ultraviolet light curable coating composition according to claim 13, wherein the reactive solvent is a member selected from the group consisting of acrylic and methacrylic acid derivatives and vinylic compounds.

17. An ultraviolet light curable coating composition according to claim 14, wherein the reactive solvent is a member selected from the group consisting of acrylic and methacrylic acid derivatives and vinylic compounds.

18. An ultraviolet light curable coating composition according to claim 15, wherein the reactive solvent is a member selected from the group consisting of acrylic and methacrylic acid derivatives and vinylic compounds.

19. An ultraviolet light curable coating composition according to claim 18, wherein the acrylic and methacrylic acid derivatives are pentaerithritol tetra(meth)acrylate, pentaerithritol tri(meth)acrylate, trimethylolpropane tri(meth)acrylate, ethylene glycol di(meth)acrylate, diethylene glycol di(meth)acrylate, 1,3-butanediol di(meth)acrylate, 1,4-butanediol di(meth)acrylate, 1,6-hexanediol di(meth)acrylate, 2-hydroxyethyl (meth)acrylate, 2-hydroxypropyl (meth)acrylate, alkyl (meth)acrylates wherein the alkyl has 1 to 18 carbon atoms, and glycidyl (meth)acrylate, dipentaerithritol hexaacrylate and dipentaerithritol pentaacrylate.

20. A process according to claim 9, wherein the unsaturated carboxylic acid is acrylic acid, methacrylic acid or itaconic acid.

21. An esterified resin obtained by the process of claim 10.

22. An ultraviolet light curable coating composition comprising an esterified resin of claim 9 and a reactive solvent.

23. An ultraviolet light curable coating composition according to claim 22, wherein the reactive solvent is a member selected from the group consisting of acrylic and methacrylic acid derivatives and vinylic compounds.

* * * * *